(12) United States Patent
Hwang

(10) Patent No.: US 11,139,709 B2
(45) Date of Patent: Oct. 5, 2021

(54) STATOR ASSEMBLY OF HAIRPIN WINDING MOTOR

(71) Applicant: HYUNDAI MOBIS Co., Ltd., Seoul (KR)

(72) Inventor: Seong Jun Hwang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 118 days.

(21) Appl. No.: 16/525,953

(22) Filed: Jul. 30, 2019

(65) Prior Publication Data

US 2020/0127517 A1   Apr. 23, 2020

(30) Foreign Application Priority Data

Oct. 22, 2018  (KR) .................. 10-2018-0126137

(51) Int. Cl.
*H02K 3/28*  (2006.01)
*H02K 3/50*  (2006.01)

(52) U.S. Cl.
CPC ............... *H02K 3/28* (2013.01); *H02K 3/50* (2013.01); *H02K 2203/09* (2013.01)

(58) Field of Classification Search
CPC .. H02K 3/28; H02K 15/0037; H02K 15/0087; H02K 15/064; H02K 2203/09; H02K 3/48; H02K 3/50
USPC ........................................................ 310/208
See application file for complete search history.

(56) References Cited

U.S. PATENT DOCUMENTS

| 2003/0214190 | A1* | 11/2003 | Congdon | H02K 15/0081 310/71 |
| 2003/0233747 | A1* | 12/2003 | Gorohata | H02K 15/0081 29/596 |
| 2008/0148551 | A1* | 6/2008 | Hara | H02K 15/0081 29/596 |
| 2011/0278973 | A1* | 11/2011 | Utaka | H02K 3/28 310/71 |
| 2013/0300232 | A1* | 11/2013 | Jung | H02K 15/0087 310/71 |
| 2016/0303686 | A1* | 10/2016 | Ciampolini | H02K 15/0081 |
| 2016/0308413 | A1* | 10/2016 | Ciampolini | H02K 3/50 |
| 2016/0308426 | A1* | 10/2016 | Ciampolini | H02K 15/0081 |

FOREIGN PATENT DOCUMENTS

KR  10-2014-0083780 A   7/2014

* cited by examiner

*Primary Examiner* — Alex W Mok
(74) *Attorney, Agent, or Firm* — Morgan, Lewis & Bockius LLP

(57) ABSTRACT

A stator assembly of a hairpin winding motor, comprises a hairpin coil, which includes a first end including a pair of two ends of the hairpin coil arranged to be adjacent to each other in a radial direction, a second end including a pair of two ends of the hairpin coil arranged to be adjacent to each other outside the first end in the radial direction, and a third end including a pair of two ends of the hairpin coil arranged to be adjacent to each other outside the second end in the radial direction. Here, a plurality of such first to third ends are repetitively formed along a circumferential direction, and a fixing cap fixes a preset number of ends among the plurality of first to third ends repetitively formed along the circumferential direction.

15 Claims, 5 Drawing Sheets

STATOR ASSEMBLY OF HAIRPIN WINDING MOTOR

CROSS-REFERENCE TO RELATED APPLICATION

This application claims priority to and the benefit of Korean Patent Application No. 10-2018-0126137, filed on Oct. 22, 2018, the disclosure of which is incorporated herein by reference in its entirety.

BACKGROUND

1. Field of the Invention

The present invention relates to a stator assembly of a hairpin winding motor, and more particularly, to a stator assembly of a hairpin winding motor, which is capable of preventing ends of a hairpin coil from being burned and reducing inspection costs for managing welding quality by deleting a welding process necessary for electrically connecting a pair of ends of the hairpin coil to each other.

2. Description of the Related Art

In accordance with implementing a greenhouse gas emission regulation and international demands for improving fuel efficiency of vehicles, research and development and commercialization of eco-friendly vehicle-related components have been vigorously performed in the car industry field.

A technology of providing a driving force using an electric motor as a sort of eco-friendly vehicle-related components has been developed. Particularly, to this end, a motor productivity-related technology including motor-working efficiency is necessary.

In complete vehicle companies and eco-friendly component manufacturers, a hairpin coil is applied to a driving motor as part of developing a technique of reducing weights and volumes of eco-friendly components to reduce a weight of a vehicle or an eco-friendly vehicle and secure an internal space thereof.

In a hairpin coil-applied driving motor according to a conventional technique, advantages in aspects of efficiency and power density by increasing a space factor of a vehicle-driving motor may be present but there are serious difficulties in manufacturing and quality management.

According to a method of manufacturing the hairpin coil-applied driving motor according to the conventional technique, unlike a general motor on which a coil is wound, a hairpin coil is manufactured by molding or forming an angular copper coil having a general angular cross section or a ring-shaped coil to be U-shaped previously so as to be inserted into a slot of a stator core.

FIG. 1 is a perspective view of a stator assembly of a hairpin winding motor according to a conventional technique.

A hairpin coil 1 according to the conventional technique is inserted into a slot 3 of a stator core 2 in an axial direction of a motor.

Ends of the hairpin coil 1 which protrude outside the slot 3 of the stator core 2 are twisted to be physically contactable.

The hairpin coil is modified to have a plurality of layers and inserted into the slot 3.

Also, two of a plurality of such hairpin coils 1 are in a pair, and ends of the pair of the hairpin coils 1 are connected to each other through welding W.

However, in an angular copper coil winding method or a hairpin coil winding method according to a conventional technique, since there are many cases in which ends of hairpin coils are burned by faulty welding, a shape of a welded part, and the like, there is a serious disadvantage in productivity.

Also, since it is necessary to perform destructive inspections such as a tensile strength test and the like for checking welding quality, it is inadequate for mass production and inspection costs occur for destructive inspections such as a tensile strength test and the like for checking welding quality.

SUMMARY

The present invention is directed to providing a stator assembly of a hairpin winding motor, which is capable of preventing ends of a hairpin coil from being burned by deleting a welding process necessary for electrically connecting a pair of ends of the hairpin coil to each other and capable of reducing inspection costs for managing welding quality.

According to an aspect of the present invention, there is provided a stator assembly of a hairpin winding motor. The stator assembly includes a stator core including slots in a radial shape, a hairpin coil inserted into the slot while an end thereof is exposed and in which two ends of the hairpin coil adjacent to each other in a radial direction are in pairs, a fixing cap configured to fix a plurality of such ends of the hairpin coil, and a fixing member configured to pass through the fixing cap such that the fixing cap fixes the ends of the hairpin coil. Here, the hairpin coil includes a first end including a pair of two ends of the hairpin coil arranged to be adjacent to each other in the radial direction, a second end including a pair of two ends of the hairpin coil arranged to be adjacent to each other outside the first end in the radial direction, and a third end including a pair of two ends of the hairpin coil arranged to be adjacent to each other outside the second end in the radial direction. Also, a plurality of such first to third ends are repetitively formed along a circumferential direction, and the fixing cap fixes a preset number of ends among the plurality of first to third ends repetitively formed along the circumferential direction.

The fixing cap may include a first cap having one surface coming into contact with a first inner end of the hairpin coil disposed inside in the radial direction among the first ends, a second cap having one surface coming into contact with a second inner end of the hairpin coil disposed inside in the radial direction among the second ends and the other surface coming into contact with a first outer end of the hairpin coil disposed outside in the radial direction among the first ends, a third cap having one surface coming into contact with a third inner end of the hairpin coil disposed inside in the radial direction among the third ends and the other surface coming into contact with a second outer end of the hairpin coil disposed outside in the radial direction among the second ends, and a fourth cap having the other surface coming into contact with a third outer end of the hairpin coil disposed outside in the radial direction among the third ends.

The first cap may include a first body portion configured to form a body, a pair of first edge walls configured to extend outside from both ends of the first body portion in the radial direction, and a plurality of first partition walls configured to extend outside from the first body portion in the radial direction between the pair of first edge walls. The second cap may include a second body portion configured to form a body, a pair of second edge walls configured to extend outside from both ends of the second body portion in the radial direction, and a plurality of second partition walls configured to extend outside from the second body portion in the radial direction between the pair of second edge walls. The third cap may include a third body portion configured to form a body, a pair of third edge walls configured to extend outside from both ends of the third body portion in the radial direction, and a plurality of third partition walls configured to extend outside from the third body portion in the radial direction between the pair of third edge walls. The fourth cap may include a fourth body portion configured to form a body, a pair of fourth edge walls configured to extend inside from both ends of the fourth body portion in the radial direction and to face the third edge walls, and a plurality of fourth partition walls configured to extend inside from the fourth body portion in the radial direction between the pair of fourth edge walls and to face the third partition walls.

The plurality of first ends repetitively formed along the circumferential direction may each be inserted between the pair of first edge walls and the plurality of first partition walls. The plurality of second ends repetitively formed along the circumferential direction may each be inserted into the pair of second edge walls and the plurality of second partition walls. The plurality of third ends repetitively formed along the circumferential direction may each be inserted into the pair of third edge walls and the plurality of third partition walls.

A thickness of each of the first to third ends may be greater than a thickness of each of the first to fourth edge walls and the first to fourth partition walls.

A through hole, through which the fixing member passes, may be formed in each of the first to fourth caps.

The first to fourth caps may be moved in a direction of facing each other by tightening of the fixing member and may pressurize each of the first to third ends.

According to another aspect of the present invention, there is provided a stator assembly of a hairpin winding motor. The stator assembly includes a stator core including slots in a radial shape, a hairpin coil inserted into the slot while an end thereof is exposed and in which two ends of the hairpin coil adjacent to each other in a radial direction are in pairs, a fixing cap configured to fix a plurality of such ends of the hairpin coil, and a fixing member configured to pass through the fixing cap such that the fixing cap fixes the ends of the hairpin coil. Here, the hairpin coil includes a first end including a pair of two ends of the hairpin coil arranged to be adjacent to each other in the radial direction, a second end including a pair of two ends of the hairpin coil arranged to be adjacent to each other outside the first end in the radial direction, and a third end including a pair of two ends of the hairpin coil arranged to be adjacent to each other outside the second end in the radial direction. A plurality of such first to third ends are repetitively formed along a circumferential direction, and the fixing cap fixes the plurality of first to third ends repetitively formed along the circumferential direction.

The fixing cap may include a first cap having one surface coming into contact with a first inner end of the hairpin coil disposed inside in the radial direction among the first ends, a second cap having one surface coming into contact with a second inner end of the hairpin coil disposed inside in the radial direction among the second ends and the other surface coming into contact with a first outer end of the hairpin coil disposed outside in the radial direction among the first ends, a third cap having one surface coming into contact with a third inner end of the hairpin coil disposed inside in the radial direction among the third ends and the other surface coming into contact with a second outer end of the hairpin coil disposed outside in the radial direction among the second ends, and a fourth cap having a closed-loop shape and having an inner circumferential surface coming into contact with a third outer end of the hairpin coil disposed outside in the radial direction among the third ends.

The first cap may include a first body portion configured to form a body, a pair of first edge walls configured to extend outside from both ends of the first body portion in the radial direction, and a first partition wall configured to extend outside from the first body portion in the radial direction between the pair of first edge walls The second cap may include a second body portion configured to form a body, a pair of second edge walls configured to extend outside from both ends of the second body portion in the radial direction, and a second partition wall configured to extend outside from the second body portion in the radial direction between the pair of second edge walls. The third cap may include a third body portion configured to form a body, a pair of third edge walls configured to extend outside from both ends of the third body portion in the radial direction, and a third partition wall configured to extend outside from the third body portion in the radial direction between the pair of third edge walls.

A plurality of such first to third caps may be formed to be spaced apart along the inner circumferential surface of the fourth cap.

The plurality of first ends repetitively formed along the circumferential direction may each be inserted between the first edge walls and the first partition wall. The plurality of second ends repetitively formed along the circumferential direction may each be inserted into the second edge walls and the second partition wall. The plurality of third ends repetitively formed along the circumferential direction may each be inserted into the third edge walls and the third partition wall.

A thickness of each of the first to third ends may be greater than a thickness of each of the first to fourth edge walls and the first to fourth partition walls.

A through hole, through which the fixing member passes, may be formed in each of the first to fourth caps.

The first to fourth caps may be moved in a direction of facing each other by tightening of the fixing member and may pressurize each of the first to third ends.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF THE EMBODIMENTS

Advantages and features of the present invention and a method of achieving the same will become apparent with reference to the attached drawings and embodiments described below in detail. However, the present invention is not limited to the embodiments described below and may be embodied with a variety of different modifications. The embodiments are merely provided to allow one of ordinary skill in the art to completely understand the scope of the present invention, and the present invention is defined by the disclosure of the claims. Meanwhile, the terms used herein are for explaining embodiments but are not intended to limit the present invention. Throughout the specification, unless particularly defined otherwise, singular forms include plural forms. The terms "comprises" or "comprising" are used herein as meanings which do not exclude presence or addition of one or more other components, stages, operations, and/or elements in addition to stated components, stages, operations, and/or elements.

Hereinafter, exemplary embodiments of the present invention will be described in detail with reference to the attached drawings.

Figure 1:
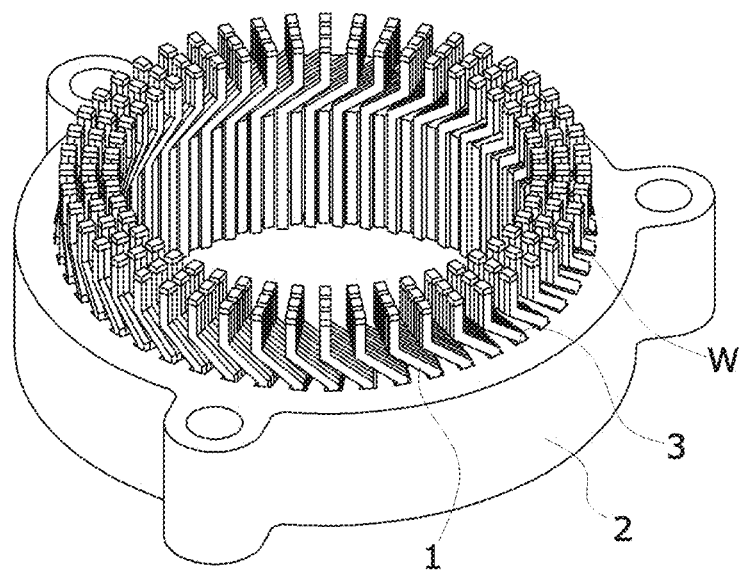
FIG. 1 is a perspective view of a stator assembly of a hairpin winding motor according to a conventional technology.
Figure 2:
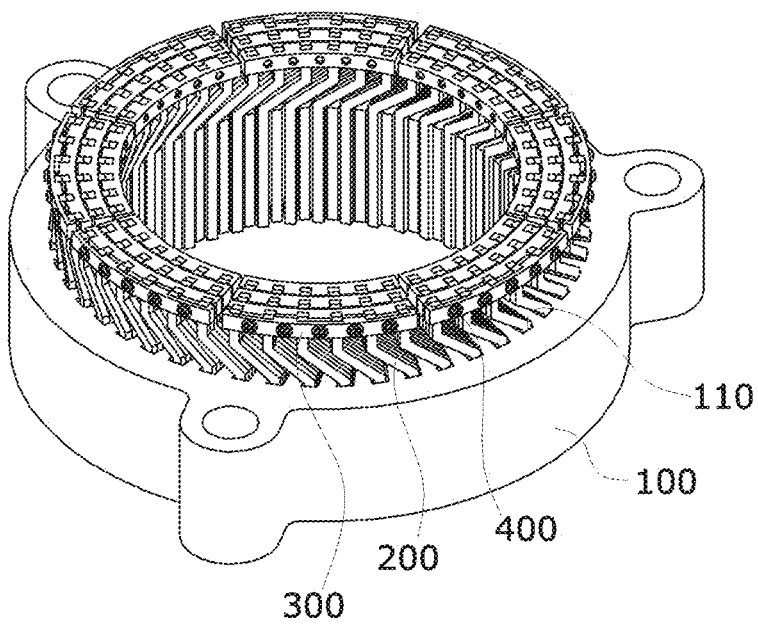
FIG. 2 is a perspective view of a stator assembly of a hairpin winding motor according to one embodiment of the present invention.
Figure 3:
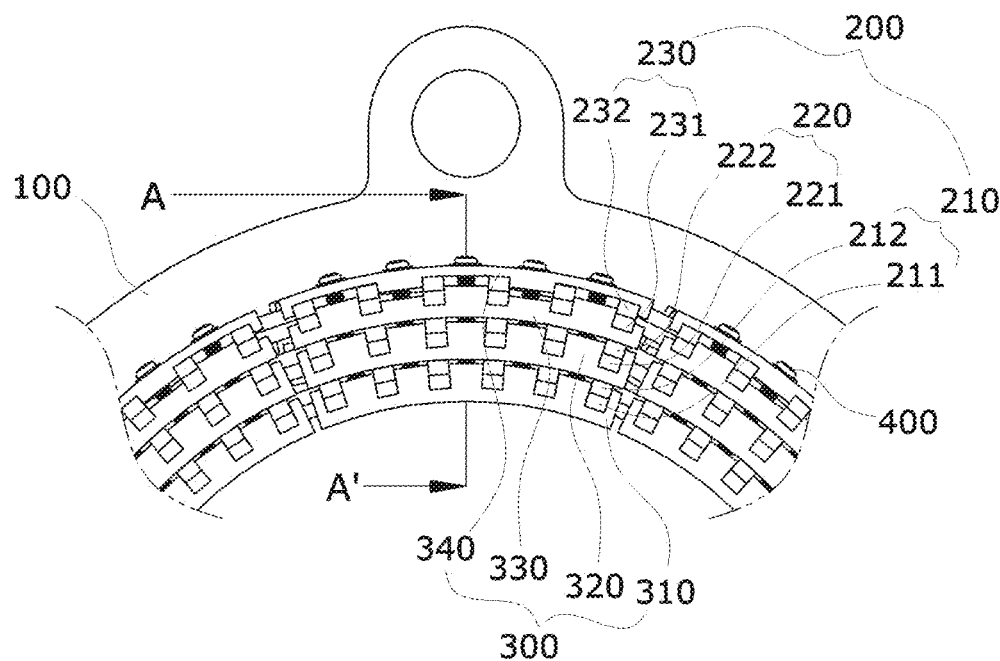
FIG. 3 is a plan view of the stator assembly of the hairpin winding motor according to one embodiment of the present invention.
Figure 4:
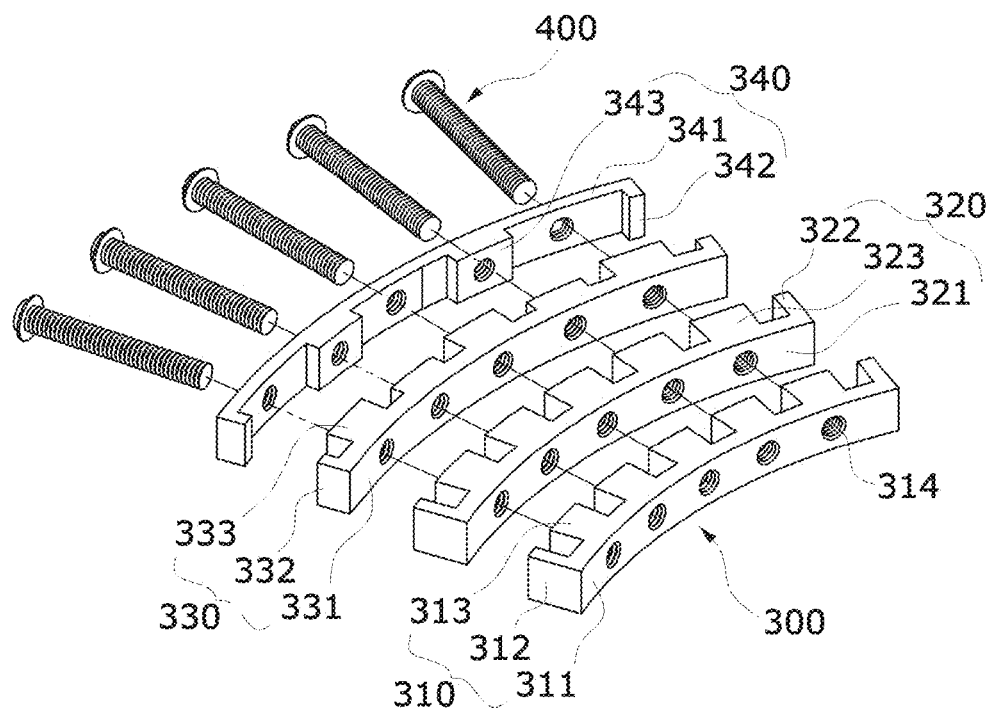
FIG. 4 is a perspective view of a fixing cap of the stator assembly of the hairpin winding motor according to one embodiment of the present invention.
Figure 5:
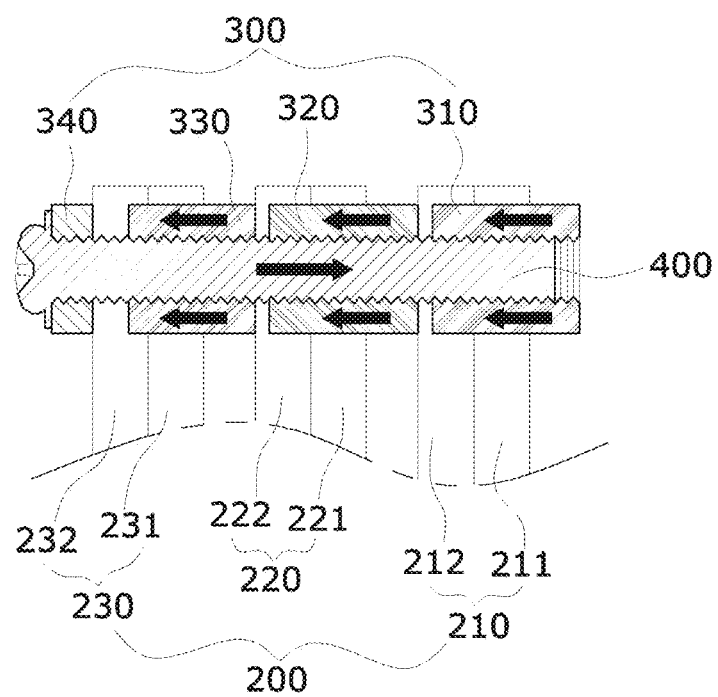
FIG. 5 is a cross-sectional view taken along a line A-A' shown in FIG. 3.

FIG. 2 is a perspective view of a stator assembly of a hairpin winding motor according to one embodiment of the present invention, FIG. 3 is a plan view of the stator assembly of the hairpin winding motor according to one embodiment of the present invention, FIG. 4 is a perspective view of a fixing cap of the stator assembly of the hairpin winding motor according to one embodiment of the present invention, and FIG. 5 is a cross-sectional view taken along a line A-A' shown in FIG. 3.

Referring to FIGS. 2 to 5, the stator assembly of the hairpin winding motor according to one embodiment of the present invention includes a stator core 100, a hairpin coil 200, a fixing cap 300, and a fixing member 400.

A plurality of slots 110 pass through the stator core 100 in a radial shape along a circumferential direction.

Here, the stator core 100 is not limited to the drawings and may employ a well-known stator core.

That is, since the stator core 100 is equal or similar to a well-known technique, a detailed description thereof will be omitted not to obscure the essentials of the present invention.

The hairpin coil 200 is inserted in the slot 110, while an end thereof is exposed, and has a connecting part where low coils, which are processed through a coil processor to be coated and to have a linear length with a certain diameter, are connected to each other.

In the present invention, six hairpin coils 200 are inserted into one slot 110, while ends thereof are exposed, and wound such that two ends of the hairpin coils 200 adjacent in a radial direction form one pair.

In more detail, the hairpin coil 200 includes a first end 210, a second end 220, and a third end 230.

Referring to FIG. 3, the first end 210 includes a pair of two ends of the two hairpin coils 200 adjacent to each other in a radial direction among the hairpin coils 200 inserted in the slot 110.

Also, the second end 220 includes a pair of ends of the two hairpin coils 200 adjacent to each other and arranged outward from the first end 210 in a radial direction among the hairpin coils 200 inserted in the slot 110.

Also, the third end 230 includes a pair of ends of the two hairpin coils 200 adjacent to each other and arranged outward from the second end 220 in a radial direction among the hairpin coils 200 inserted in the slot 110.

A plurality of such first ends 210 to third ends 230 are repetitively formed along a circumferential direction.

Also, in the stator assembly of the hairpin winding motor according to one embodiment of the present invention, a preset number of ends among the ends of the hairpin coils 200 adjacent to each other in a circumferential direction are fixed by a fixing tab.

Meanwhile, a plurality of ends of the hairpin coil 200, which are exposed from the stator core 100, may have the same heights.

Due thereto, when the ends of the hairpin coil 200 are mutually fixed by the fixing cap 300, it is possible to prevent any one of the ends of the hairpin coil 200 from being easily separated from the other.

The fixing cap 300 fixes a preset number of ends among the first ends 210 to the third ends 230 repetitively formed along a circumferential direction and prevents a pair of ends of the hairpin coil 200 from being separated from each other.

Meanwhile, the plurality of ends of the hairpin coil 200 in the circumferential direction are arranged to be spaced at an interval apart.

Also, a length of the fixing cap 300 in the circumferential direction is greater than a total area of the preset number of the first ends 210 to the third ends 230.

Due thereto, the fixing cap 300 may firmly protect the first to third ends 210 to 230 from a force applied from the outside.

The fixing cap 300, as shown in FIG. 4, includes a first cap 310, a second cap 320, a third cap 330, and a fourth cap 340.

Referring to FIGS. 3 and 4, the first cap 310 comes into contact with a first inner end 211 of the hairpin coil 200 disposed inside in a radial direction among the first ends 210.

The first cap 310 includes a first body portion 311, a first edge wall 312, and a first partition wall 313.

The first body portion 311 forms a body of the first cap 310 and comes into contact with the first inner end 211 of the hairpin coil 200 disposed inside in a radial direction among the first ends 210.

A pair of such first edge walls 312 are provided and extend outside from both ends of the first body portion 311 in a radial direction.

A plurality of such first partition walls 313 are provided and spaced equidistantly apart between the pair of first edge walls 312 at a distance therefrom and extend outside from the first body portion 311 in a radial direction.

The plurality of first ends 210 repetitively formed along a circumferential direction are each inserted between the pair of first edge walls 312 and the plurality of first partition walls 313.

Accordingly, the first edge wall 312 surrounds an outer surface of the first end 210 in a circumferential direction, which is disposed outermost among the preset number of first ends 210.

Due thereto, the first edge wall 312 may prevent effectively the first end 210 disposed outermost among the preset number of first ends 210 from being separated from the first cap 310 in a circumferential direction of the stator core 100.

Also, the first partition walls 313 may prevent the plurality of first ends 210 each inserted between the plurality of first partition walls 313 from coming into electrical contact with each other and may arrange the plurality of first ends 210 repetitively formed along a circumferential direction, to be definitely partitioned.

The second cap 320 has one surface, which comes into contact with a second inner end 221 of the hairpin coil 200 disposed inside in a radial direction among the second ends 220, and the other surface, which comes into contact with a first outer end 212 of the hairpin coil 200 disposed outside in a radial direction among the first ends 210.

The second cap 320 includes a second body portion 321, a second edge wall 322, and a second partition wall 323.

The second body portion 321 forms a body of the second cap 320 and has one surface, which comes into contact with the second inner end 221 of the hairpin coil 200 disposed inside in a radial direction among the second ends 220, and the other surface, which comes into contact with the first outer end 212 of the hairpin coil 200 disposed outside in a radial direction among the first ends 210.

A pair of such second edge walls 322 are provided and extend outside from both ends of the second body portion 321 in a radial direction.

A plurality of such second partition walls 323 are provided and spaced equidistantly apart between the pair of second edge walls 322 at a distance therefrom and extend outside from the second body portion 321 in a radial direction.

The plurality of second ends 220 repetitively formed along a circumferential direction are each inserted between the pair of second edge walls 322 and the plurality of second partition walls 323.

Accordingly, the second edge wall 322 surrounds an outer surface of the second end 220 in a circumferential direction, which is disposed outermost among the preset number of second ends 220.

Therefore, the second edge wall 322 may prevent effectively the second end 220 disposed outermost among the preset number of second ends 220 from being separated from the second cap 320 in the circumferential direction of the stator core 100.

Also, the second partition walls 323 may prevent the plurality of second ends 220 each inserted between the plurality of second partition walls 323 from coming into electrical contact with each other and may arrange the plurality of second ends 220 repetitively formed along a circumferential direction, to be definitely partitioned.

The third cap 330 has one surface, which comes into contact with a third inner end 231 of the hairpin coil 200 disposed inside in a radial direction among the third ends 230, and the other surface, which comes into contact with a second outer end 222 of the hairpin coil 200 disposed outside in a radial direction among the second ends 220.

The third cap 330 includes a third body portion 331, a third edge wall 332, and a third partition wall 333.

The third body portion 331 forms a body of the third cap 330 and has one surface, which comes into contact with the third inner end 231 of the hairpin coil 200 disposed inside in a radial direction among the third ends 230, and the other surface, which comes into contact with the second outer end 222 of the hairpin coil 200 disposed outside in a radial direction among the second ends 220.

A pair of such third edge walls 332 are provided and extend outside from both ends of the third body portion 331 in a radial direction.

The third partition walls 333 are provided and spaced equidistantly apart between the pair of third edge walls 332 at a distance therefrom and extend outside from the third body portion 331 in a radial direction.

The plurality of third ends 230 repetitively formed along a circumferential direction are each inserted between the pair of third edge walls 332 and the plurality of third partition walls 333.

Accordingly, the third edge wall 332 surrounds an outer surface of the third inner end 231 of the hairpin coil 200 in a circumferential direction, which is disposed outermost inside in a radial direction among the preset number of third ends 230.

Due thereto, the third edge wall 332 may prevent effectively the third inner end 231 disposed outermost among the preset number of third ends 230 from being separated from the third cap 330 in the circumferential direction of the stator core 100.

Also, the third partition walls 333 may prevent the third inner ends 231 among the plurality of third ends 230 each inserted between the plurality of third partition walls 333 from coming into electrical contact with each other and may arrange each of the third inner ends 231 among the plurality of third ends 230 repetitively formed along a circumferential direction to be definitely partitioned.

The fourth cap 340 has the other surface coming into contact with a third outer end 232 of the hairpin coil 200, which is disposed outside in a radial direction among the third ends 230.

The fourth cap 340 includes a fourth body portion 341, a fourth edge wall 342, and a fourth partition wall 343.

The fourth body portion 341 forms a body of the fourth cap 340, and the other surface thereof comes into contact with the third outer end 232 of the hairpin coil 200 disposed outside in the radial direction among the third ends 230.

A pair of such fourth edge walls 342 are provided and extend from both ends of the fourth body portion 341 inside in a radial direction and face ends of the third edge wall 332.

The fourth partition walls 343 are provided and spaced equidistantly apart between the pair of fourth edge walls 342 at a distance therefrom and extend outside from the fourth body portion 341 in a radial direction.

The plurality of third ends 230 repetitively formed along a circumferential direction are each inserted between the pair of fourth edge walls 342 and the plurality of fourth partition walls 343.

Accordingly, the fourth edge wall surrounds an outer surface of the third outer end 232 of the hairpin coil 200 in a circumferential direction, which is disposed outermost outside in a radial direction among the preset number of third ends 230.

Therefore, the fourth edge wall 342 may prevent effectively the end of the hairpin coil 200, which is disposed outermost outside the radial direction among the preset number of third ends 230 from being separated from the fourth cap 340 in the circumferential direction of the stator core 100.

Also, the fourth partition walls 343 may prevent the third outer ends 232 among the plurality of third ends 230 each inserted between the plurality of fourth partition walls 343 from coming into electrical contact with each other and may arrange each of the third outer ends 232 among the plurality of third ends 230 repetitively formed along a circumferential direction to be definitely partitioned.

Meanwhile, through holes 314 are formed in the first to the fourth caps 310 to 340.

The through holes 314, through which the fixing member 400 passes, are formed in each of the first to the fourth caps 310 to 340.

A screw thread is formed on an inner circumferential surface of the through hole 314 and screw-coupled with the fixing member 400.

Referring to FIGS. 4 and 5, the fixing member 400 passes through the fixing cap 300, and more particularly, the through hole 314 such that the fixing cap 300 fixes the first to third ends 210 to 230.

In more detail, the fixing member 400 has a screw thread formed on an outer circumferential surface thereof and is screw-coupled with the through hole 314.

Accordingly, the first to fourth caps 310 to 340 may move in a direction of facing each other by tightening of the fixing member 400 and may pressurize the first to third ends 210 to 230.

Therefore, the first to third ends 210 to 230 may be firmly fixed to the fixing cap 300.

Meanwhile, a thickness of each of the first to third ends 210 to 230 is greater than a thickness of each of the first to fourth edge walls 312 to 342 and the first to fourth partition walls 313 to 343.

Therefore, when the first to fourth caps 310 to 340 move in the direction of facing each other due to tightening of the fixing member 400, before ends of the first edge wall 312 and the first partition wall 313 come into contact with the other surface of the second body portion 321, ends of the second edge wall 322 and the second partition wall 323 come into contact with the other surface of the third body portion 331, and ends of the third edge wall 332 and the third partition wall 333 come into contact with ends of the fourth edge wall 342 and the fourth partition wall 343, they each come into contact with the first to third ends 210 to 230 such that the fixing cap 300 may firmly fix the first to third ends 210 to 230 to each other.

Therefore, the fixing member 400 may firmly fix the first to third ends 210 to 230 to each other.

Accordingly, the stator assembly of the hairpin winding motor according to one embodiment of the present invention may reduce a time for assembling the plurality of ends of the hairpin coil 200 by firmly fixing the first to third ends 210 to 230 using the fixing cap 300 and the fixing member 400.

Also, the ends of the hairpin coil 200 are fixed without welding such that the ends of the hairpin coil 200 may be prevented from being burned. Inspection costs may be reduced by omitting a destructive inspection such as a tensile strength test and the like for checking welding quality, and products may be produced under a mass production.

Hereinafter, a stator assembly of a hairpin winding motor according to another embodiment of the present invention will be described in detail with reference to the attached drawings.

Figure 6:
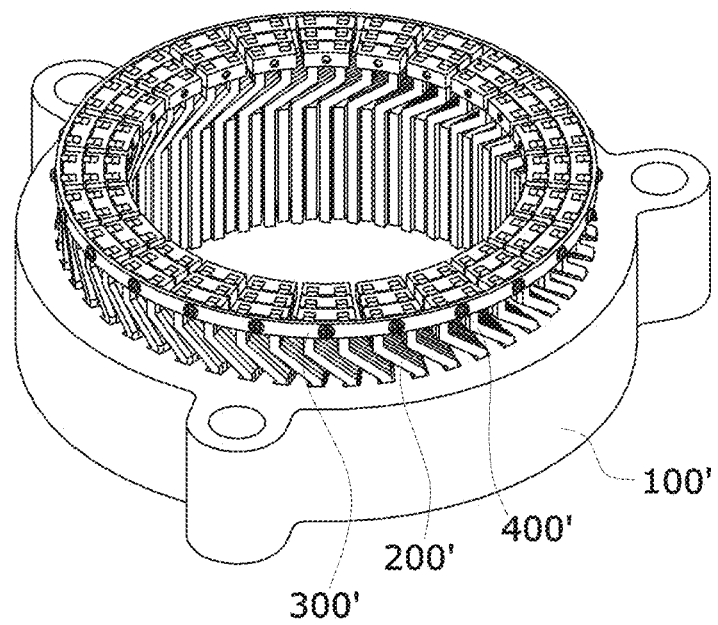
FIG. 6 is a perspective view of a stator assembly of a hairpin winding motor according to another embodiment of the present invention.
Figure 7:
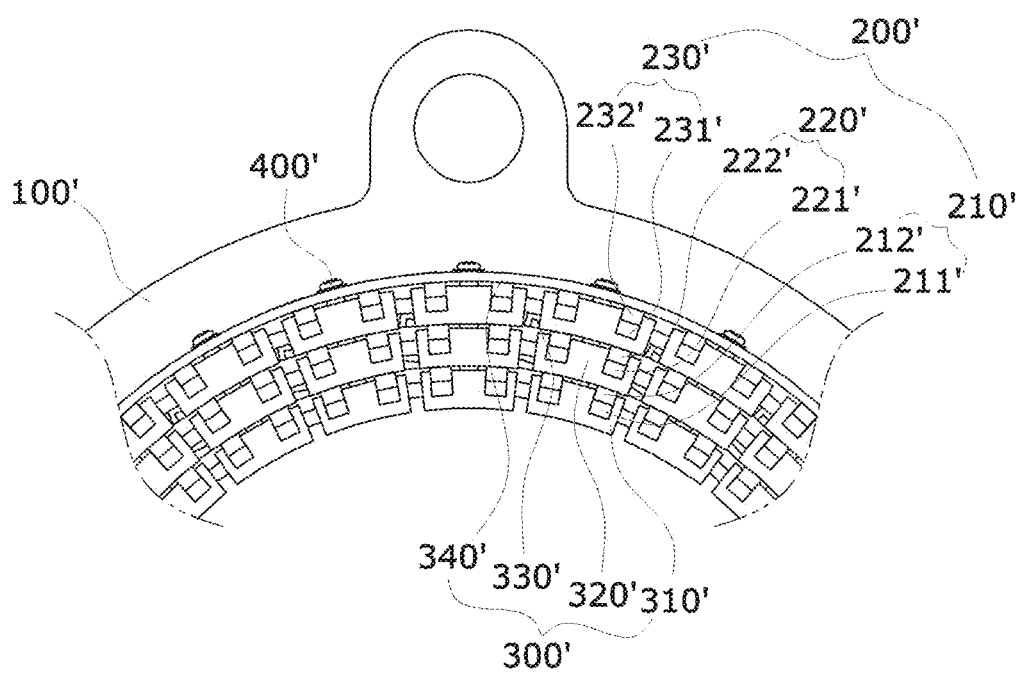
FIG. 7 is a plan view of the stator assembly of the hairpin winding motor according to another embodiment of the present invention.
Figure 8:
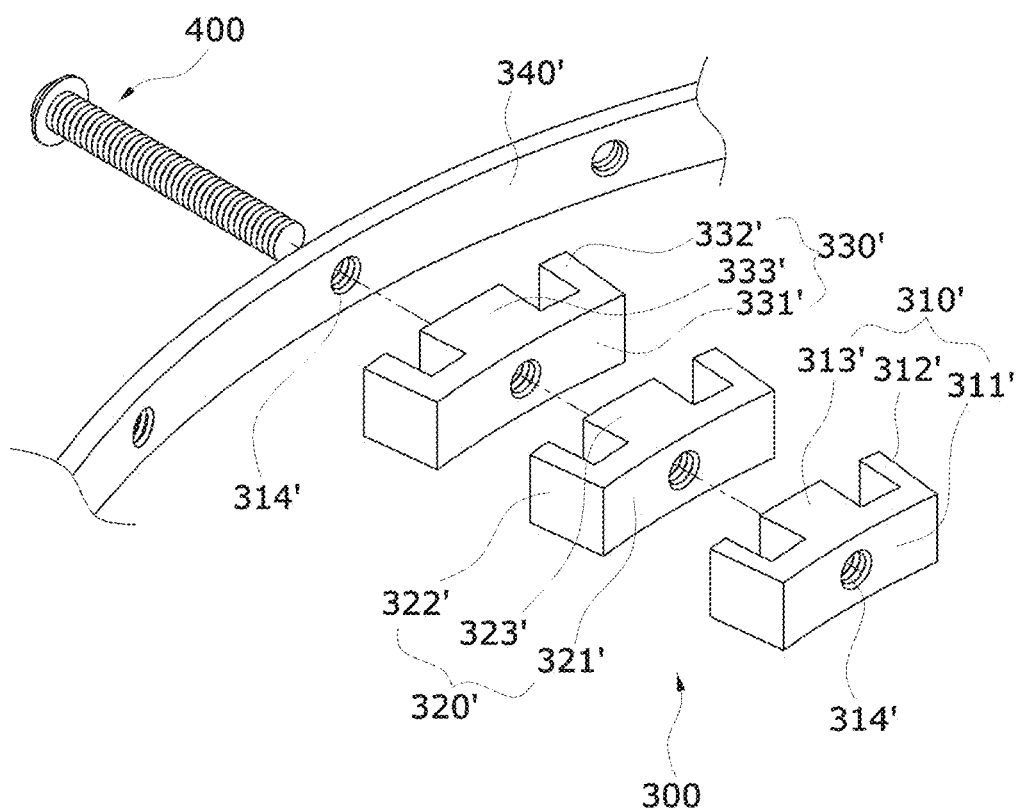
FIG. 8 is a perspective view of a fixing cap of the stator assembly of the hairpin winding motor according to another embodiment of the present invention.

FIG. 6 is a perspective view of a stator assembly of a hairpin winding motor according to another embodiment of the present invention, FIG. 7 is a plan view of the stator assembly of the hairpin winding motor according to another embodiment of the present invention, and FIG. 8 is a perspective view of a fixing cap of the stator assembly of the hairpin winding motor according to another embodiment of the present invention.

Referring to FIGS. 6 to 8, the stator assembly of the hairpin winding motor according to another embodiment of the present invention includes a stator core 100', a hairpin coil 200', a fixing cap 300', and a fixing member 400'.

Meanwhile, not to obscure the essentials of the present invention, a detailed description on the same components as those described above in one embodiment will be omitted.

The fixing cap 300' according to another embodiment of the present invention fixes a plurality of first to third ends 210' to 230' repetitively formed along a circumferential direction and prevents a pair of ends of the hairpin coil 200' from being separated from each other.

The fixing cap 300' includes a first cap 310', a second cap 320', a third cap 330', and a fourth cap 340'.

One surface of the first cap 310' comes into contact with a first inner end 211' of the hairpin coil 200' disposed inside a radial direction among the pair of first ends 210' of the hairpin coil 200'.

The first cap 310' includes a first body portion 311', a first edge wall 312', and a first partition wall 313'.

Referring to FIGS. 7 and 8, the first body portion 311' forms a body of the first cap 310' and comes into contact with the first inner end 211' of the hairpin coil 200' disposed inside in a radial direction among the first ends 210'.

A pair of such first edge walls 312' are provided and extend outside from both ends of the first body portion 311' in a radial direction.

One first partition wall 313' is provided between the pair of first edge walls 312' at a distance from the first edge walls 312' and extends outside from the first body portion 311' in a radial direction.

A pair of first ends 210' adjacent to each other in a circumferential direction among the plurality of first ends 210' repetitively formed along a circumferential direction are each inserted between the pair of first edge walls 312' and the first partition wall 313'.

Accordingly, the first edge wall 312' surrounds outer surfaces of the pair of first ends 210' in a circumferential direction.

Therefore, the first edge wall 312' may prevent effectively the pair of first ends 210' from being separated from the first cap 310' in a circumferential direction of the stator core 100'.

Also, the first partition wall 313' may prevent the pair of first ends 210' inserted between the first partition wall 313' and the pair of first edge walls 312' from coming into electrical contact with each other and may arrange the pair of first ends 210' formed to be spaced apart along a circumferential direction to be definitely partitioned.

The second cap 320' has one surface, which comes into contact with a second inner end 221' of the hairpin coil 200' disposed inside in a radial direction among the second ends 220', and the other surface, which comes into contact with a first outer end 212' of the hairpin coil 200' disposed outside in a radial direction among the first ends 210'.

The second cap 320' includes a second body portion 321', a second edge wall 322', and a second partition wall 323'.

The second body portion 321' forms a body of the second cap 320' and has one surface, which comes into contact with the second inner end 221' of the hairpin coil 200' disposed inside in a radial direction among the second ends 220', and the other surface, which comes into contact with the first outer end 212' of the hairpin coil 200' disposed outside in a radial direction among the first ends 210'.

A pair of such second edge walls 322' are provided and extend outside from both ends of the second body portion 321' in a radial direction.

One second partition wall 323' is provided between the pair of second edge walls 322' at a distance from the second edge walls 322' and extends outside from the second body portion 321' in a radial direction.

A pair of such second ends 220' adjacent to each other in a circumferential direction among the plurality of second ends 220' repetitively formed along a circumferential direction are each inserted between the pair of second edge walls 322' and the second partition wall 323'.

Accordingly, the second edge wall 322' surrounds outer surfaces of the pair of second ends 220' in a circumferential direction.

Therefore, the second edge wall 322' may prevent effectively the pair of second ends 220' from being separated from the second cap 320' in the circumferential direction of the stator core 100'.

Also, the second partition wall 323' may prevent the pair of second ends 220' inserted between the second partition wall 323' and the pair of second edge walls 322' from coming into electrical contact with each other and may arrange the pair of second ends 220' formed to be spaced apart along a circumferential direction to be definitely partitioned.

The third cap 330' has one surface, which comes into contact with a third inner end 231' of the hairpin coil 200' disposed inside in a radial direction among the third ends 230', and the other surface, which comes into contact with a second outer end 222' of the hairpin coil 200' disposed outside in a radial direction among the second ends 220'.

The third cap 330' includes a third body portion 331', a third edge wall 332', and a third partition wall 333'.

The third body portion 331' forms a body of the third cap 330' and has one surface, which comes into contact with the third inner end 231' of the hairpin coil 200' disposed inside in a radial direction among the third ends 230, and the other surface, which comes into contact with the second outer end 222' of the hairpin coil 200' disposed outside in a radial direction among the second ends 220.

A pair of such third edge walls 332' are provided and extend outside from both ends of the third body portion 331' in a radial direction.

One third partition wall 333' is provided between the pair of third edge walls 332' at a distance from the third edge walls 332' and extends outside from the third body portion 331' in a radial direction.

A pair of such third ends 230' adjacent to each other in a circumferential direction among the plurality of third ends 230' repetitively formed along a circumferential direction are each inserted between the pair of third edge walls 332' and the third partition wall 333'.

Accordingly, the third edge wall 332' surrounds outer surfaces of the pair of third ends 230' in a circumferential direction.

Therefore, the third edge wall 332' may prevent effectively the pair of third ends 230' from being separated from the third cap 330' in the circumferential direction of the stator core 100'.

Also, the third partition wall 333' may prevent the pair of third ends 230' inserted between the third partition wall 333' and the pair of third edge walls 332' from coming into electrical contact with each other and may arrange the pair of third ends 230' formed to be spaced apart along a circumferential direction to be definitely partitioned.

The fourth cap' 340' has the other surface coming into contact with a third outer end 232' of the hairpin coil 200', which is disposed outside in a radial direction among the third ends 230'.

Also, the fourth cap 340' has a closed-loop shape.

Therefore, the fourth cap 340' may be formed to have a shape surrounding a perimeter of a plurality of ends of the hairpin coil 200', which are repetitively formed along a circumferential direction.

Meanwhile, a plurality of such first to third caps 310' to 330' are formed to be spaced apart along an inner circumferential surface of the fourth cap 340'.

Also, the plurality of first ends 210' repetitively formed along the circumferential direction each are inserted between the first edge walls 312' and the first partition wall 313', the plurality of second ends 220' repetitively formed along the circumferential direction each are inserted between the second edge walls 322' and the second partition wall 323', and the plurality of third ends 230' repetitively formed along the circumferential direction each are inserted between the third edge walls 332' and the third partition wall 333'.

That is, in the fixing cap 300' according to another embodiment of the present invention, the plurality of first to third caps 310' to 330' are fixed along an inner circumferential surface of one fourth cap 340' and then the plurality of first to third ends 210' to 230' repetitively formed along the circumferential direction are inserted into the first to third caps 310' to 330' at once such that an assembling time for inserting the plurality of ends of the hairpin coil 200' into the fixing cap 300' may be reduced.

Meanwhile, through holes 314' are formed in the first to the fourth caps 310' to 340'.

The through hole 314', through which the fixing member 400' passes, is formed in each of the first to the third caps 310' to 330'.

Also, a plurality of such through holes 314' formed in the fourth cap 340' are formed in the inner circumferential surface of the fourth cap 340' at positions corresponding to the through holes 314' formed in the first to third caps 310' to 330'

A screw thread is formed on an inner circumferential surface of the through hole 314' and screw-coupled with the fixing member 400'.

Here, the screw thread formed on the inner circumferential surface of the through hole 314' may be formed on inner circumferential surfaces of the first to third caps 310' to 330', and the through hole 314' formed in the fourth cap 340' may be formed as a simple hole.

The fixing member 400' passes through the fixing cap 300', and more particularly, the through hole 314' such that the fixing cap 300' fixes the first to third ends 210' to 230'.

In more detail, the fixing member 400' has a screw thread formed on an outer circumferential surface thereof and is screw-coupled with the through hole 314'.

Accordingly, the first to fourth caps 310' to 340' may move in a direction of facing each other by tightening of the fixing member 400' and may pressurize the first to third ends 210' to 230' such that the first to third ends 210' to 230' may be firmly fixed to the fixing cap 300'.

Meanwhile, a thickness of each of the first to third ends 210' to 230' is greater than a thickness of each of the first to third edge walls 312' to 332' and the first to third partition walls 313' to 333'.

Therefore, when the first to fourth caps 310' to 340' move in the direction of facing each other due to tightening of the fixing member 400', before ends of the first edge wall 312' and the first partition wall 313' come into contact with the other surface of the second body portion 321', ends of the second edge wall 322' and the second partition wall 323' come into contact with the other surface of the third body portion 331', and ends of the third edge wall 332' and the third partition wall 333' come into contact with the other surface of the fourth cap, they each come into contact with the first to third ends 210' to 230' such that the fixing cap 300' may firmly fix the first to third ends 210' to 230' to each other.

Therefore, the fixing member 400' may firmly fix the first to third ends 210' to 230' to each other.

As described above, in the stator assembly of the hairpin winding motor according to the embodiments of the present invention, the plurality of ends of the hairpin coil 200 exposed from the stator core 100 have the same heights such that it is possible to prevent any one of the ends of the hairpin coil 200 from being easily separated from another when the ends of the hairpin coil 200 are fixed to each other by the fixing cap 300.

Since the plurality of ends of the hairpin coil 200, which are repetitively formed along a circumferential direction, each are inserted between the pairs of edge walls 312, 322, 332, and 342 and the plurality of partition walls 313, 323, 333, and 343 such that the edge walls 312, 322, 332, and 342 surround outer surfaces of the ends disposed outermost in a circumferential direction among a preset number of ends of the hairpin coil 200, the ends disposed outermost among the preset number of ends may be effectively prevented from being easily separated from the fixing cap 300 in a circumferential direction of the stator core 100.

The plurality of ends each inserted between the plurality of partition walls 313, 323, 333, and 343 may be prevented from coming into electrical contact with each other, and the plurality of ends repetitively formed along the circumferential direction may each be arranged to be definitely partitioned.

Since a thickness of each of the first to third ends 210 to 230 is greater than a thickness of the first to fourth edge walls 312 to 342 and the first to fourth partition walls 313 to 343, the fixing member 400 may firmly fix the first to third ends 210 to 230 to each other.

In the fixing cap 300' according to another embodiment of the present invention, the plurality of first to third caps 310' to 330' are fixed along an inner circumferential surface of one fourth cap 340' and then the plurality of first to third ends 210' to 230' repetitively formed along the circumferential direction are inserted into the first to third caps 310' to 330' at once such that an assembling time for inserting the plurality of ends of the hairpin coil 200' into the fixing cap 300' may be reduced.

Also, the ends of the hairpin coil 200 or 200' are fixed each other without welding such that the ends of the hairpin coil 200 or 200' may be prevented from being burned. Inspection costs may be reduced by omitting a destructive inspection such as a tensile strength test and the like for checking welding quality, and products may be produced under a mass production.

In the stator assembly of the hairpin winding motor according to one embodiment of the present invention, the plurality of ends of the hairpin coil exposed from the stator core have the same heights such that it is possible to prevent any one of the ends of the hairpin coil from being easily separated from another when the ends of the hairpin coil are fixed to each other by the fixing cap.

Since the plurality of ends of the hairpin coil, which are repetitively formed along a circumferential direction, each are inserted between the pairs of edge walls and the plurality of partition walls such that the edge walls surround outer surfaces of the ends disposed outermost in the circumferential direction among a preset number of ends of the hairpin coil, the ends disposed outermost among the preset number of ends may be effectively prevented from being easily separated from the fixing cap in a circumferential direction of the stator core.

The plurality of ends each inserted between the plurality of partition walls may be prevented from coming into electrical contact with each other, and the plurality of ends repetitively formed along the circumferential direction may each be arranged to be definitely partitioned.

Since a thickness of each of the first to third ends is greater than a thickness of the first to fourth edge walls and the first to fourth partition walls, the fixing member may firmly fix the first to third ends to each other.

In the fixing cap according to another embodiment of the present invention, the plurality of first to third caps are fixed along an inner circumferential surface of one fourth cap and then the plurality of first to third ends repetitively formed along the circumferential direction are inserted into the first to third caps at once such that an assembling time for inserting the plurality of ends of the hairpin coil into the fixing cap may be reduced.

The ends of the hairpin coil are fixed without welding such that the ends of the hairpin coil may be prevented from being burned. Inspection costs may be reduced by omitting a destructive inspection such as a tensile strength test and the like for checking welding quality, and products may be produced under a mass production.

The present invention is not limited to the above-described embodiments and may be implemented while being variously modified within an allowable range of the technical concept of the present invention.

What is claimed is:

1. A stator assembly of a hairpin winding motor, comprising:
    a stator core including slots in a radial shape;
    a hairpin coil inserted into the slot while an end thereof is exposed and in which two ends of the hairpin coil adjacent to each other in a radial direction are in pairs;
    a fixing cap configured to fix a plurality of such ends of the hairpin coil; and
    a fixing member configured to pass through the fixing cap such that the fixing cap fixes the ends of the hairpin coil,
    wherein the hairpin coil comprises:
        a first end including a pair of two ends of the hairpin coil arranged to be adjacent to each other in the radial direction;
        a second end including a pair of two ends of the hairpin coil arranged to be adjacent to each other outside the first end in the radial direction; and
        a third end including a pair of two ends of the hairpin coil arranged to be adjacent to each other outside the second end in the radial direction,
    wherein a plurality of such first to third ends are repetitively formed along a circumferential direction, and
    wherein the fixing cap fixes a preset number of ends among the plurality of first to third ends repetitively formed along the circumferential direction.

2. The stator assembly of claim 1, wherein the fixing cap comprises:
    a first cap having one surface coming into contact with a first inner end of the hairpin coil disposed inside in the radial direction among the first ends;
    a second cap having one surface coming into contact with a second inner end of the hairpin coil disposed inside in the radial direction among the second ends and the other surface coming into contact with a first outer end of the hairpin coil disposed outside in the radial direction among the first ends;
a third cap having one surface coming into contact with a third inner end of the hairpin coil disposed inside in the radial direction among the third ends and the other surface coming into contact with a second outer end of the hairpin coil disposed outside in the radial direction among the second ends; and
a fourth cap having the other surface coming into contact with a third outer end of the hairpin coil disposed outside in the radial direction among the third ends.

3. The stator assembly of claim 2,
wherein the first cap comprises:
a first body portion configured to form a body;
a pair of first edge walls configured to extend outside from both ends of the first body portion in the radial direction; and
a plurality of first partition walls configured to extend outside from the first body portion in the radial direction between the pair of first edge walls,
wherein the second cap comprises:
a second body portion configured to form a body;
a pair of second edge walls configured to extend outside from both ends of the second body portion in the radial direction; and
a plurality of second partition walls configured to extend outside from the second body portion in the radial direction between the pair of second edge walls,
wherein the third cap comprises:
a third body portion configured to form a body;
a pair of third edge walls configured to extend outside from both ends of the third body portion in the radial direction; and
a plurality of third partition walls configured to extend outside from the third body portion in the radial direction between the pair of third edge walls, and
wherein the fourth cap comprises:
a fourth body portion configured to form a body;
a pair of fourth edge walls configured to extend inside from both ends of the fourth body portion in the radial direction and to face the third edge walls; and
a plurality of fourth partition walls configured to extend inside from the fourth body portion in the radial direction between the pair of fourth edge walls and to face the third partition walls.

4. The stator assembly of claim 3,
wherein the plurality of first ends repetitively formed along the circumferential direction are each inserted between the pair of first edge walls and the plurality of first partition walls,
wherein the plurality of second ends repetitively formed along the circumferential direction are each inserted into the pair of second edge walls and the plurality of second partition walls, and
wherein the plurality of third ends repetitively formed along the circumferential direction are each inserted into the pair of third edge walls and the plurality of third partition walls.

5. The stator assembly of claim 4, wherein a thickness of each of the first to third ends is greater than a thickness of each of the first to fourth edge walls and the first to fourth partition walls.

6. The stator assembly of claim 3, wherein a through hole, through which the fixing member passes, is formed in each of the first to fourth caps.

7. The stator assembly of claim 6, wherein the first to fourth caps are moved in a direction of facing each other by tightening of the fixing member and pressurize each of the first to third ends.

8. A stator assembly of a hairpin winding motor, comprising:
a stator core including slots in a radial shape;
a hairpin coil inserted into the slot while an end thereof is exposed and in which two ends of the hairpin coil adjacent to each other in a radial direction are in pairs;
a fixing cap configured to fix a plurality of such ends of the hairpin coil; and
a fixing member configured to pass through the fixing cap such that the fixing cap fixes the ends of the hairpin coil,
wherein the hairpin coil comprises:
a first end including a pair of two ends of the hairpin coil arranged to be adjacent to each other in the radial direction;
a second end including a pair of two ends of the hairpin coil arranged to be adjacent to each other outside the first end in the radial direction; and
a third end including a pair of two ends of the hairpin coil arranged to be adjacent to each other outside the second end in the radial direction,
wherein a plurality of such first to third ends are repetitively formed along a circumferential direction, and
wherein the fixing cap fixes the plurality of first to third ends repetitively formed along the circumferential direction.

9. The stator assembly of claim 8, wherein the fixing cap comprises:
a first cap having one surface coming into contact with a first inner end of the hairpin coil disposed inside in the radial direction among the first ends;
a second cap having one surface coming into contact with a second inner end of the hairpin coil disposed inside in the radial direction among the second ends and the other surface coming into contact with a first outer end of the hairpin coil disposed outside in the radial direction among the first ends;
a third cap having one surface coming into contact with a third inner end of the hairpin coil disposed inside in the radial direction among the third ends and the other surface coming into contact with a second outer end of the hairpin coil disposed outside in the radial direction among the second ends; and
a fourth cap having a closed-loop shape and having an inner circumferential surface coming into contact with a third outer end of the hairpin coil disposed outside in the radial direction among the third ends.

10. The stator assembly of claim 9,
wherein the first cap comprises:
a first body portion configured to form a body;
a pair of first edge walls configured to extend outside from both ends of the first body portion in the radial direction; and
a first partition wall configured to extend outside from the first body portion in the radial direction between the pair of first edge walls,
wherein the second cap comprises:
a second body portion configured to form a body;
a pair of second edge walls configured to extend outside from both ends of the second body portion in the radial direction; and a second partition wall configured to extend outside from the second body portion in the radial direction between the pair of second edge walls, and wherein the third cap comprises:
  a third body portion configured to form a body;
  a pair of third edge walls configured to extend outside from both ends of the third body portion in the radial direction; and
  a third partition wall configured to extend outside from the third body portion in the radial direction between the pair of third edge walls.

11. The stator assembly of claim 10, wherein a plurality of such first to third caps are formed to be spaced apart along the inner circumferential surface of the fourth cap.

12. The stator assembly of claim 10, wherein the plurality of first ends repetitively formed along the circumferential direction are each inserted between the first edge walls and the first partition wall, wherein the plurality of second ends repetitively formed along the circumferential direction are each inserted into the second edge walls and the second partition wall, and wherein the plurality of third ends repetitively formed along the circumferential direction are each inserted into the third edge walls and the third partition wall.

13. The stator assembly of claim 12, wherein a thickness of each of the first to third ends is greater than a thickness of each of the first to fourth edge walls and the first to fourth partition walls.

14. The stator assembly of claim 10, wherein a through hole, through which the fixing member passes, is formed in each of the first to fourth caps.

15. The stator assembly of claim 14, wherein the first to fourth caps are moved in a direction of facing each other by tightening of the fixing member and pressurize each of the first to third ends.

* * * * *